Feb. 8, 1938.   R. D. SHAW   2,108,025
HYDRAULIC OPERATION AND CONTROL OF MACHINE TOOLS
Filed May 22, 1930   4 Sheets-Sheet 4

INVENTOR
Robert D. Shaw
BY
M. H. Lockwood
ATTORNEY

Patented Feb. 8, 1938

2,108,025

UNITED STATES PATENT OFFICE 2,108,025

HYDRAULIC OPERATION AND CONTROL OF MACHINE TOOLS

Robert D. Shaw, Brooklyn, N. Y., assignor to Niles-Bement-Pond Company, Hartford, Conn., a corporation of New Jersey Application May 22, 1930, Serial No. 454,646

29 Claims. (Cl. 90—13.5)

This improvement relates to the operation of the reciprocating slides of machine tools hydraulically by a fluid under pressure and controlled by valves adapted to be operated manually or automatically for controlling the motions of the slides. Machine tools in which slides are mounted for direct and reverse motions are usually provided with lead screws adapted to be rotated in one direction or the other for the respective motions of the slide, but it has been found that for some classes of work, hydraulic operation and control of the motions is preferable and the principal object of the present improvement is to provide improved hydraulically operated means with manual control and automatic control of the motions by a tracer following a template or pattern representing the shape or form to be reproduced in the work.

In machines for reproducing work from a pattern it is preferable to provide a transverse slide upon which the tracer and cutter are mounted for motion toward and from the pattern and work respectively, the in and out motions of the slide being under control of the tracer by cooperation with the pattern.

In order to reproduce work of three dimensions, it is essential, in addition to the transverse in and out motions, to provide for horizontal and vertical motions of the tracer and cutter relative to the pattern and work, and to control these motions while the tracer is following the pattern to control in and out motion of the transverse slide.

Hence, suitable hydraulically operated means, such as a cylinder and piston operated by fluid under pressure, are provided for actuating the respective slides for the direct and reverse motions thereof. In the present instance, the motions of the slides are referred to as right and left motion of the horizontal slide; up and down motion of the vertical slide and in and out (or toward and from) motion of the transverse slide.

The motions of the respective hydraulically operated slides are adapted to be controlled by suitable valves adapted to admit the operating fluid under pressure to one end or the other of the respective cylinders according to the direction of motion to be effected. Suitable hydraulic valves for controlling the motions of the slides may be operated automatically or manually in any suitable or preferred manner to effect the various motions, but in the present instance, the valves are arranged to be operated by electromagnets, preferably operating on relatively high potential circuits and controlled by suitable switches for manual operation and control.

In general automatic control of the motions is preferred and for this purpose, an electric tracer is mounted on the transverse slide for cooperation with the pattern for automatic control of the in and out motions of the transverse slide and, by suitable interlocking means, to control the motions of the respective horizontal and vertical slides.

Any suitable tracer control may be provided, but it is preferred to use an electric tracer having front and back contacts, wherein the front contact is normally closed when the tracer point is out of contact with the pattern, at which time the back contact is normally open, but is adapted to be closed by excessive pressure on the tracer point in contact with the pattern.

When the tracer is following the pattern over a plain surface or a surface of uniform depth, both the front and back contacts of the tracer will remain open and the table motion will be effective in a straight line, either horizontal or vertical according to the prevailing table motion selected, but when the tracer is following an irregular (hill and dale) surface, the motion of the transverse slide will be either in or out, as the tracer follows depressions and rises in the pattern and during such in or out motions of the transverse slide, it is essential that the table motion should be stopped. Therefore, an important feature of the present improvement is the table stop control.

Control of the table motion of the horizontal and vertical slides, in connection with the in and out motion of the transverse slide, may be effected in various ways, but preferably the valves for controlling the in and out motions of the transverse slide are mechanically interlocked with auxiliary valves in the supply pipe connections to the valves which control the motions of the horizontal and vertical slides, the arrangement being such that the latter cannot be operated while the transverse slide is in motion, either in or out. This interlock of the hydraulic control is a novel feature, being positive and independent of the electrical control.

During operation of the machine, the usual practice is to have the prevailing table motion continuous either horizontally or vertically, while the tracer, in following the pattern, controls the in and out motion of the transverse slide. At the end of the run of the prevailing table motion, the other motion is brought into action for step by step feed and the prevailing table motion is reversed. In order to automatically control the prevailing horizontal or vertical table motion and reverse the motions automatically, the respective circuits of the electro-magnets controlling the valves of the horizontal and vertical slides are adapted to be operated by reversing contactors actuated by motion of the respective slides to operate the respective valves and reverse the motion. Another feature of the improvement is the provision of a pair of interlocked reversing relays adapted for operation by the reversing contactors (either horizontal or vertical) to cut out the energized magnet and energize the magnet of the valve for the reverse motion and a suitable switch is provided for connecting the reversing relays for control by the reversing contactors of either the horizontal or vertical slides.

The improved hydraulic control for a three dimensional three-slide machine tool for three dimensional work is shown in the accompanying drawings, in which.

Figure 1:
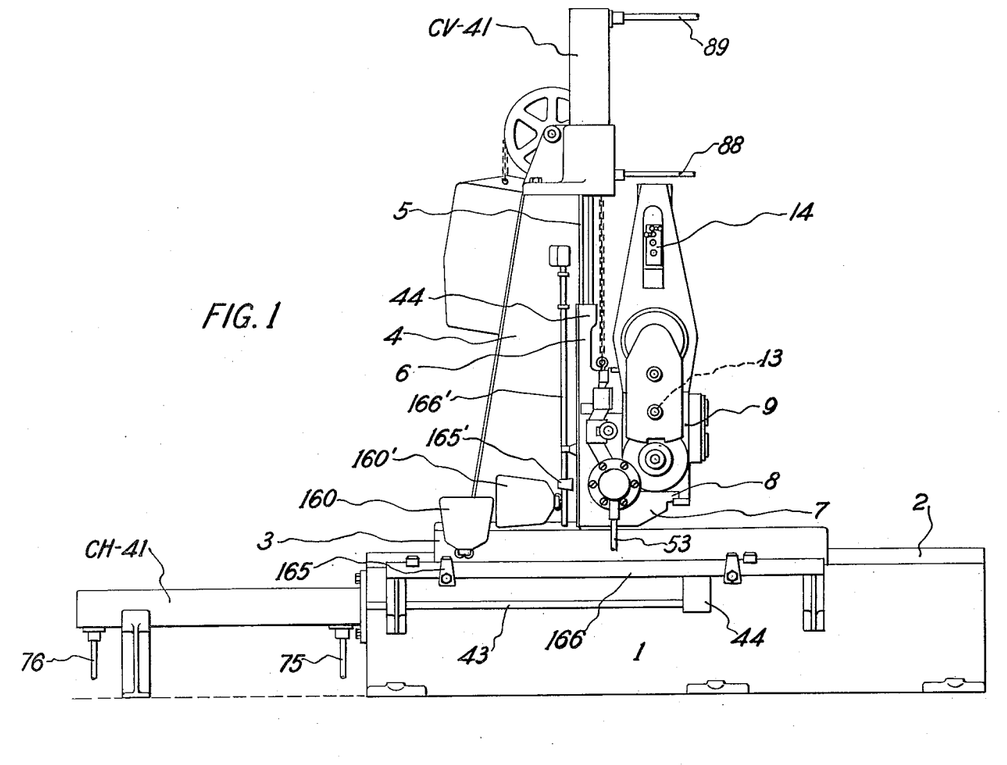
Fig. 1 is a side elevation of a die sinking three-dimensional machine tool, portions of the frame and parts being broken away.
Figure 2:
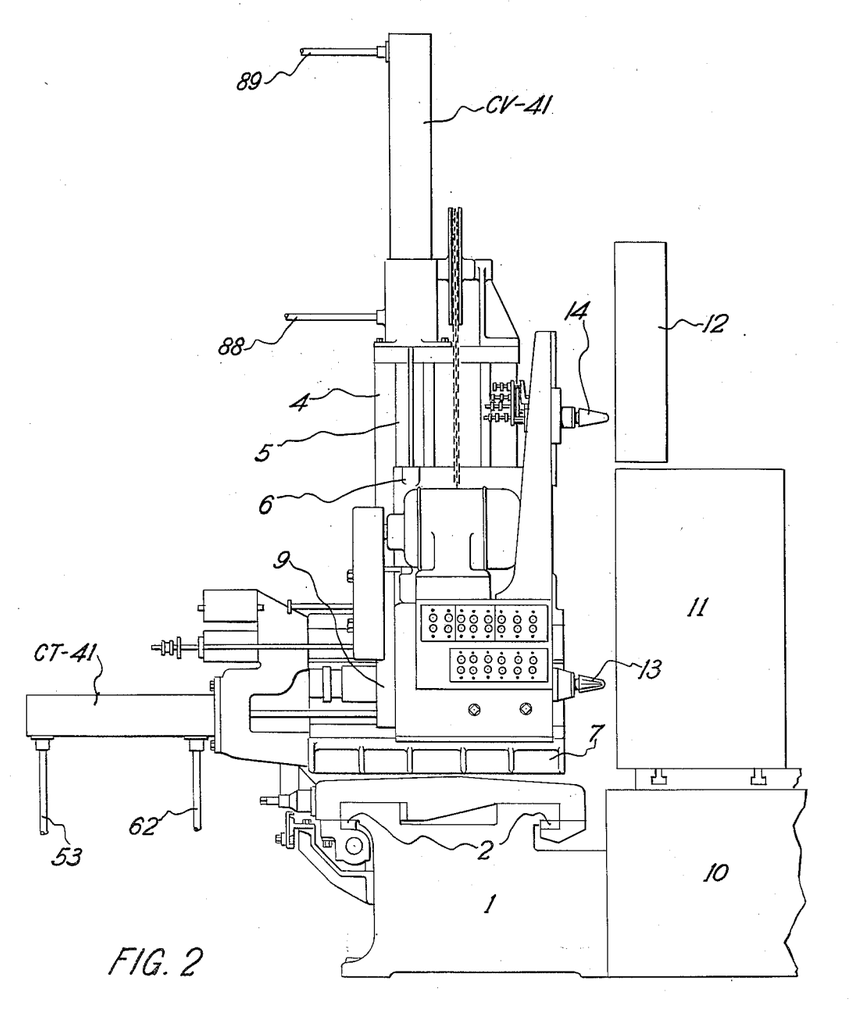
Fig. 2 shows an end view of the machine in Fig. 1, with parts broken away to show details.

Referring more particularly to Figs. 1 and 2, it will be seen that the machine used for illustration comprises a base 1, provided with horizontal slideways 2, upon which the horizontal slide 3 is adapted to reciprocate.

The horizontal slide 3 carries a pillar 4 provided on one edge with vertical slide-ways 5, upon which the vertical slide 6 is adapted to reciprocate.

The vertical slide 6 carries a saddle 7 provided with transverse slide-ways 8 upon which the transverse slide 9 is adapted to reciprocate.

In the present instance, a pier 10 or other suitable support is fixed at the rear of the machine and adapted to support the work 11 and pattern 12 in position to cooperate respectively with the cutter 13 and tracer 14, which, as will be seen in Fig. 2, are mounted upon the transverse slide 9 for motion toward and from the pattern and work, according to the motion of the transverse slide, the in and out motion of the latter being controlled by the tracer in cooperation with the pattern, as more fully described hereinafter.

In the present improvement, the horizontal (3), vertical (6) and transverse (9) slides are adapted to be operated, for direct and reverse motions of the respective slides, by hydraulically operated means, whereby the motions are effected by fluid under pressure. The hydraulic control valves, pipe connections and operating cylinders adapted for the type of machine shown in Figs. 1 and 2, will be more readily understood from the diagram in Fig. 3.

Figure 3:
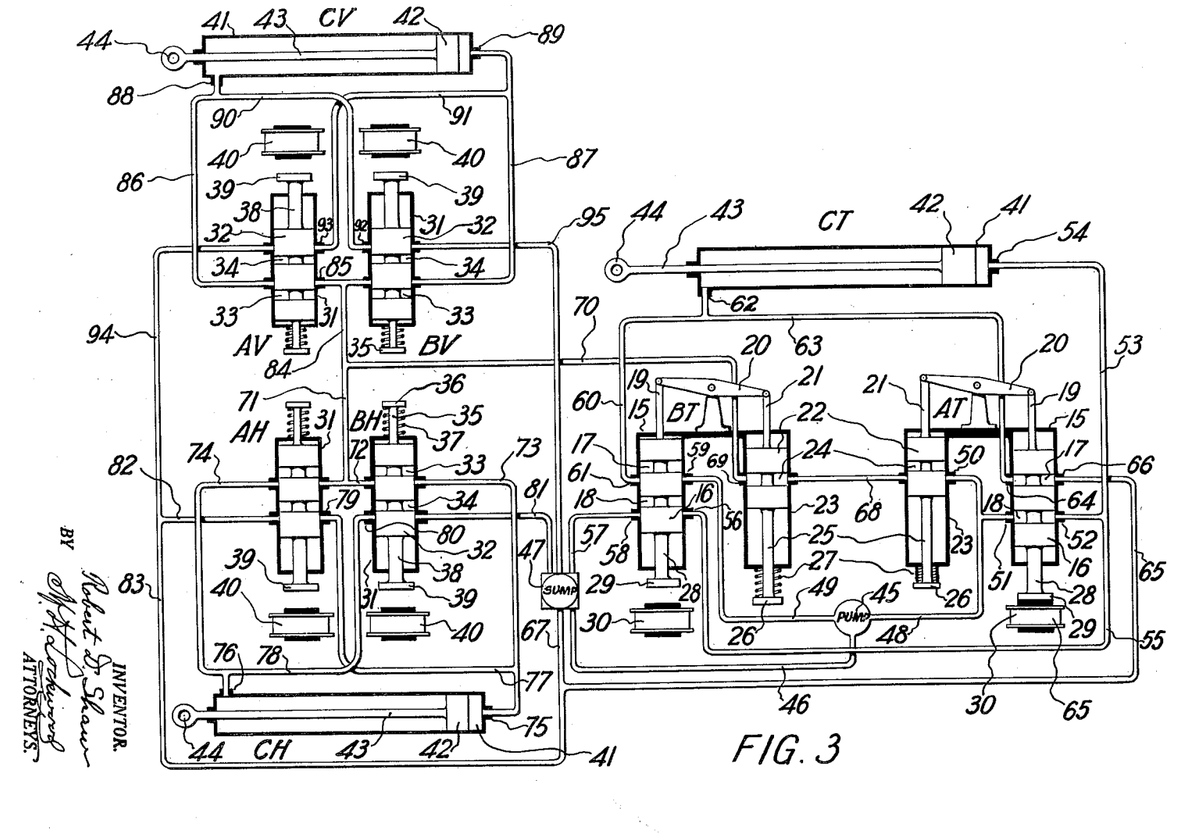
Fig. 3 is a diagram of the valves, cylinders and pipe connections for hydraulic operation and control of the machine in Figs. 1 and 2.

In describing the hydraulic control, the valves for controlling in and out motion of the transverse slide are designated AT and BT, and the operating cylinder for the transverse slide is designated CT.

Similarly, the hydraulic valves for controlling right and left motions of the horizontal slide are designated AH and BH and the operating cylinder for the horizontal slide as CH.

Similarly, the hydraulic valves for controlling up and down motions of the vertical slide are designated AV and BV and the operating cylinder for the vertical slides as CV.

The hydraulic valves AT and BT for the in and out motions of the transverse slide are alike in construction and comprise valve cylinders 15, in which piston valves 16 reciprocate, the piston valves being provided with annular grooves 17 and 18 through which the pressure fluid is adapted to flow when the piston valve is in open position, as indicated in valve AT, which is shown in operated position. In the present instance, the valve piston 16 is provided with upwardly extending stem 19 connected with a rocker arm 20, which in turn, connects with a valve stem 21 of an auxiliary valve piston 22, reciprocating in the auxiliary valve cylinder 23. The auxiliary valve piston 22 is provided with a single annular groove 24 for controlling the flow of the pressure fluid as hereinafter explained, and a valve stem 25 extending downward from the valve piston 22 and provided with a head 26 supporting a spring 27, for restoring the valves to the normal position, indicated by the position of valve BT.

For operating the main and auxiliary valves, (AT and BT) the valve piston 16 is provided with a depending stem 28, attached to or provided with a magnet armature 29 adapted to cooperate with an electro-magnet 30, which when energized, is adapted to move the main and auxiliary valve pistons and open the valve of the cylinder 15 and close the auxiliary valve of the cylinder 23, as shown by the position of the valve AT.

The hydraulic valves AH and BH for controlling horizontal motions of slide 3, and the hydraulic valves AV and BV for controlling vertical motions of slide 6 are substantially identical and comprise the valve cylinder 31, in which a valve piston 32 is adapted to reciprocate, the valve piston being provided with annular grooves 33 and 34 for controlling the flow of the pressure fluid. The valve piston 32 is provided at one end with a stem 35 having a head 36, with which a spring 37 cooperates to restore the valve to normal closed position, which is the position shown in the drawings. The opposite end of each valve piston 32 is provided with a stem 38 having a magnet armature 39 adapted to cooperate with an electro-magnet 40, for operating the respective valves, as hereinafter more fully explained.

The hydraulically operated means for effecting the motions of the respective slides comprise, in the present instance, cylinder 41 provided with a reciprocating piston 42, to either side of which the pressure fluid is adapted to be admitted for reciprocating the piston in the cylinder. Piston rods 43 are adapted to connect the pistons of the respective cylinders with the slides 3, 6 and 9 by means of bolts or pins in eyes 44 located at the ends of the respective piston rods.

For supplying fluid under pressure to the respective cylinders through suitable hydraulic valves, a pressure pump 45 is provided, which, by means of a pipe 46, is adapted to draw the oil or other fluid from a sump 47 into which the used fluid from the cylinders is discharged. Two lines of pipe 48 and 49, in the arrangement shown, are adapted for conducting the fluid under pressure from the pump 45 to the control valves. The pipe 48 is connected at 50 with the auxiliary valve AT—23 and at 51 with the valve AT—15, so as to be in position to communicate with the annular valve opening 18. The circuit through the annular opening 18 of the piston valve 15 is completed through pipe 52, one branch 53 of which is connected at 54 with the end of the cylinder CT—41. The other branch 55 of the pipe 52 is connected at 56 with the BT valve cylinder 15, in position to cooperate with the corresponding annular groove 18, the circuit being completed to the sump 47 through the pipe 57 connected at 58 to the valve cylinder 15 opposite the connection 56.

The pipe 49 leading from the pump 45 to the left in Fig. 3, is connected at 59 with the valve cylinder BT—15 in position to cooperate with the annular groove 17 of the valve piston 16 and through the annular groove 17 with the pipe 60 connected to the valve cylinder 15 at 61, the pipe 60 being in communication through the branch 62 with the opposite end of the slide operating cylinder CT—41, as will be seen in Fig. 3. The pipe branch 62 from the end of the slide cylinder 41 is provided with a branch 63, connected at 64 with the AT valve cylinder 15 in position to cooperate with the upper annular groove 17 of the valve piston 16 and then through the annular groove 17 into a pipe 65 connected with the valve cylinder 15 at 66. The pipe 65 provides a return pipe for the fluid and is connected by a branch 67 with the sump 47, as will be seen in Fig. 3.

In order to interlock control of the horizontal and vertical motions with the motions of the transverse slide, the supply of fluid under pressure for operating the horizontal and vertical hydraulic cylinders, is conducted through the auxiliary valves 22—23 of the valves AT and BT, the arrangement being such that when either of the main valves AT or BT is operated for in or out motion of the transverse slide, the associated auxiliary valve cuts off the supply of pressure fluid to the valves controlling the horizontal and vertical motions. Accordingly, the pipe 48 from the pump, which is connected at 50 to the auxiliary valve AT—23, in position to cooperate with the annular groove 24 in the auxiliary valve piston 22 is adapted to communicate through the annular groove 24 with a pipe 68 connected between the two valve cylinders AT—23 and BT—23 in position to cooperate with the annular grooves 24 of both the auxiliary valve pistons 22. The valve cylinder BT—23 is connected opposite the pipe 68, at 69, with the pipe 70 for conducting the pressure fluid to the valves controlling the horizontal and vertical motions. From this arrangement, it will be seen that when either of the auxiliary valve pistons 22 is operated, or moved out of normal position, the supply of pressure fluid to the pipe 70 (and to the horizontal and vertical slides) will be cut off.

The pipe 70 divides into two branches, one branch 71 leading to the horizontal control valves through a branch pipe 72 to the respective valve cylinders 31 of the horizontal valves AH and BH. The pipe 72 is adapted to connect through the annular grooves 33 of the valve pistons 32 with pipes 73 and 74, which connect respectively at 75 and 76 with the ends of the cylinder CH, as indicated in Fig. 3. The pipes 73 and 74 are connected with branches 77 and 78, which cross each other and connect at 79 and 80 with the valve cylinders 31 of the respective valves AH and BH, so as to cooperate with the lower annular grooves 34 in the respective piston 32. After passing through valve grooves 34 the spent fluid enters pipes 81 and 82, leading to the fluid sump 47, the pipe 81 directly and 82 through the branch pipe 83, which, it will be seen, connects with the branch pipe 67.

Another branch 84 from the pipe 70 leads to a connecting pipe 85, connecting to the cylinders 31 of the vertical control valves AV and BV and is adapted, through the annular grooves 33 of the respective valves, to communicate with pipes 86 and 87 for conducting the pressure fluid to the opposite ends of the vertical cylinder CV at 88 and 89 respectively. The pipes 86 and 87 are provided with branch pipes 90 and 91 which cross each other and connect at 92 and 93 with the respective vertical valve cylinders 31 in position to cooperate with the annular grooves 34 in the valve pistons 32. The spent fluid then passes through pipes 94 and 95 to the oil sump 47, by the pipe 95 directly, and pipe 94 through the branches 83 and 67, as will be seen from Fig. 3.

By this arrangement of the valves and pipe connections, it will be seen that when fluid pressure is applied on one side of the operating piston, the cylinder, through the valves, is open on the other side to discharge fluid into the sump 47; but when the respective valves are closed the piston (and the slide) will be immovably held by pressure of the fluid on both sides, so that there can be no motion of the corresponding slide in either direction.

Figure 4:
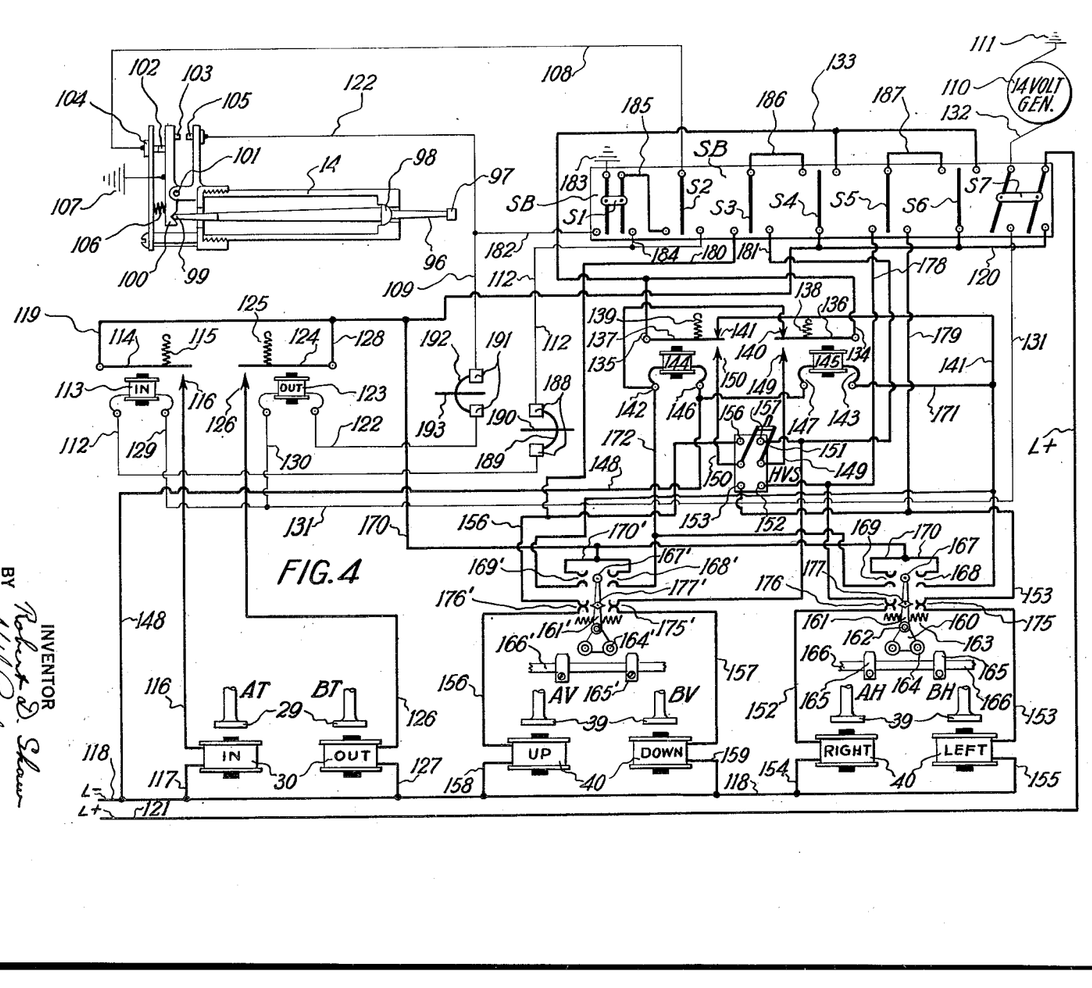
Fig. 4 is the wiring diagram for the electro-magnetically operated valves showing the electrical connections for tracer control and switches for manual control.

The electro-magnets 30 and 40 for operating the valves for direct and reverse motions of the respective slides are adapted to be controlled automatically through an electric tracer and suitable relays, and switches are provided for placing the various motions in automatic control or for manual control of the various motions, and these are shown more particularly in connection with the wiring diagram of Fig. 4. Referring to Fig. 4, it will be seen that the tracer 14 comprises a wobbling tracer bar 96, with a tracer point 97 adapted to cooperate with the pattern 12 for controlling the in and out motion of the transverse slide 9. For this purpose, the tracer bar 96 is mounted substantially as shown in Shaw Patent No. 1,518,114. The tracer bar 96 is pivoted at 98 for lateral and longitudinal movement and cooperates at 99, with the short end of a contact carrying lever 100, pivoted at 101 and carrying contacts 102 and 103 adapted to cooperate respectively with front contact 104 and back contact 105, as indicated in the upper part of Fig. 4. A spring 106 is adapted to hold the contact carrying lever 100 with the front contacts 102—104 closed, the contact carrying lever being grounded at 107 to complete low potential circuits through leads 108 and 109 from the 14 volt generator 110, which is shown as grounded at 111. The front contact lead 108 is preferably connected through lead 112 with a relay magnet 113, marked IN, for controlling in motion of the transverse slide. The armature 114 is normally held, by a spring 115, out of closing contact with the contact to lead 116 of a high potential circuit to the in magnet 30 of the hydraulic control valve AT, for in motion of the transverse slide, the circuit of lead 116 being completed through lead 117 to the main line 118, lead L—. The circuit of armature 114 is connected through the leads 119 and 120 with the positive side 121 of the main line or high potential current, designated L+ in Fig. 4.

The back tracer contact 105 is connected through lead 122, 109 with the "out" relay magnet 123, which is adapted to cooperate with an armature 124 held by spring 125 out of contact with the contact to lead 126, which is connected with the electro-magnet 30 of the BT valve for controlling out motion of the transverse slide, the circuit being completed through the lead 127 to the negative side 118 L— of the main line or high potential circuit. The armature 124 is connected through lead 128 with the leads 120 and 121 to the positive side L+ of the main line circuit. The "in" and "out" relay magnets 113 and 123 are connected by branch leads 129 and 130 with the lead 131, which returns through lead 132 to the 14 volt generator 110.

In this way, the in and out motions of the transverse slide are adapted to be controlled by the tracer as it cooperates with the pattern, thereby controlling the toward and from motion of the tool operating on the work. In machine tools of this type, however, continuous reciprocating horizontal or vertical table motion is required with step by step feed motion at right angles to the dominating table motion, but as previously pointed out, neither the horizontal nor vertical motions are permitted to take place during the in or out motion of the transverse slide, this control being effected by interlocking the auxiliary valves with the valves AT and BT controlling the in and out motions of the transverse slide, as previously explained.

In order, however, that the operation may be continuous, it is necessary to provide for automatic reverse of the direction of motion of the horizontal and vertical slides, and, for this purpose, the electro-magnets operating the respective valves for horizontal and vertical motions are preferably energized from the main line circuit L+ and L— and the motions are controlled by reversing contactors associated with the respective slides and operating through a suitable reversing relay.

Referring to Fig. 4, it will be seen that the positive side of the main line circuit L+ or lead 121 is connected through the switch board switch S6 with lead 133, which is divided and conducted by branch leads 134 and 135 through the respective armatures 136 and 137 of a reversing relay RS, the relay armatures being normally held by springs 138 and 139 to close contact on leads 140 and 141, which it will be seen cross each other and are connected by short leads 142 and 143, with relay magnets 144 and 145, respectively, which, when energized are adapted to operate the reversing armatures 137 and 136. The circuits from magnets 144 and 145 are completed through leads 146 and 147 which join a lead 148 connected with the negative side of the main line lead 118 L—.

When the relay armatures 136 and 137 are drawn down by the respective magnets 145 and 144 (and it should be understood that only one armature at a time is drawn down) the positive side of the circuit 133 is closed on contacts to leads 149 or 150, which are connected to a switch HVS, which is provided with a double-throw double-blade switch arm 151, with the blades of which the leads 149 and 150 are connected. The two switch blades 151 are adapted, when closed on one side, to cooperate with leads 152 and 153, connected, respectively, with the valve magnets AH—40 and BH—40 for the horizontal slide, the respective circuits of the magnets being completed to the negative side of the main line L—, through leads 154 and 155 to the lead 118.

When the two blade switch arm 151 is closed on the opposite side, it is adapted to close on leads 156 and 157 which connect respectively with the valve magnets AV—40 and BV—40, for the vertical slide, the magnet circuits to the lead 118 being completed through leads 158 and 159.

In order to operate the magnet armatures 136 and 137 of the reversing relay RS, alternately, to reverse the direction of motion, the horizontal and vertical slides carry reversing contactors adapted to be operated by dogs substantially as shown and described in Shaw Patent No. 1,683,581 of September 4, 1928. Accordingly there is mounted upon the horizontal slide a reversing contactor 160, provided with a lever arm 161 pivoted at 162 and normally held in a central position by oppositely acting springs 163. The lower end of the lever 161 is provided with rollers or lugs 164, adapted to engage dogs 165, mounted for adjustment parallel with the horizontal slide 3, on a bar 166. The dogs 165 are to limit the run in either direction and at the end of the run of the slide are adapted to rock the arm 161 in one direction or the other for reversing the direction of motion. Therefore, the upper end of the reversing lever 161 is provided with contact buttons 167 for engaging spring contact fingers 168 or 169 to close circuits to the relay magnets 144 and 145 for the purpose of reversing the connections to the respective valve magnets 40. It will be seen that the positive side (120) of the main line circuit is connected through lead 170 with the spring contact fingers 168 and 169. The circuit of contact fingers 168 is completed through lead 171 to 143, through the relay magnet 145 and then through 147 and 148 to the lead 118 on the negative side of the main line L—. The circuit from spring contact fingers 169 is through lead 172 to 142, through magnet 144, and then through lead 146 and 148 and to the negative side of the main line 118 L—. By tracing the circuits on the wiring diagram, it will be seen that when the horizontal reversing contactor arm 161 is moved in either direction, the motion will be reversed by deenergizing one of the valve magnets AH—40 or BH—40, and energizing the other.

The vertical slide 6 is provided with a similar reversing contactor 160', the corresponding parts of which are given the same numbers of reference with prime marks, and the vertical reversing contactor is arranged to close similar circuits for operating the same RS relay magnets 144 and 145. The corresponding vertical spring contact fingers 168' and 169' are similarly connected with the positive side of the main line L+ through the same lead 170, and by leads 173 and 174 are connected with the respective leads 171 and 172 to the magnets 145 and 144, the arrangement being substantially as described in connection with the horizontal reversing contactor.

The horizontal and vertical slides 3 and 6, when in motion, might possibly overrun in either direction, and, as a matter of safety, the circuits of the leads 152 and 153 of the horizontal slide control magnets and of leads 156 and 157 of the vertical slide control magnets are carried through spring fingers 175, 175' and 176, 176', which are normally closed to complete the respective circuits. When, however, the slide overruns the reversing contactor arm 161 or 161' which carries a double wedge 177, 177' of insulating material adapted to enter between the closed spring fingers 175, 175' or 176, 176' and break the circuit of the valve magnet 40, which at the time happens to be energized and giving motion to the slide, thereby breaking the circuit of the control magnet and stopping the motion.

For manual control of the direct and reverse motions of the horizontal slide, the leads 152 and 153 to the horizontal control magnets 40 are connected through leads 178 and 179 with terminals cooperating with a switch S5 for closing either circuit according to the direction of motion desired.

Similarly, for manual control of direct and reverse motions of the vertical slide, the leads 156 and 157 to the vertical control magnets 40 are connected by leads 180 and 181 with terminals to a double throw switch S3 for manually closing circuits for either direction of vertical motion.

The leads of the various circuits are interconnected by switches grouped in a central control board SB shown in the upper right hand corner of the wiring diagram Fig. 4. The first switch at the left end of the switch board, designated S1, is in the low potential circuit and provided with the two switch arms tied together to operate in unison for manual control of the in and out motions of the transverse slide. The switch S1 when moved to the left, connects lead 182 to 122 to the out relay magnet 123, thereby grounding the circuit at 183, and operating the out magnet independently of the tracer. The switch S1 thrown to the right connects a lead 184 with lead 112 from the in relay magnet 113 and back through connector 185 and switch S2 and lead 108 to the ground 107, thus manually controlling the in motion of the transverse slide.

Switch S2 is a single-arm double-throw switch for connecting the lead 108 with lead 112 for tracer control of the transverse slide (the tracer contact 102—104 normally closes the in magnet circuit) or to the short inter-terminal lead 185 to the manual control switch S1.

The switch S3 is a single-arm double-throw switch for manual control of the motions of the vertical slide, previously described the switch being adapted, when switch S4 is thrown to the left to include connector 186 to close the circuit from the positive side of the circuit 120, L+ to the leads 180 or 181, according to the direction of motion desired for the vertical slide.

The switch S4 is a double throw switch for connecting the positive side of the high potential circuit through lead 120 with lead 133 for control through the reversing relay or with the interconnecting lead 186 to the switch S3 for manual control of the vertical slide.

The switch S5 is likewise a double throw single-arm switch for manual operation to control direct and reverse motions of the horizontal slide, the switch being adapted, when switch S6 is thrown to include connector 187, to close with the lead 178 or 179 connected to the horizontal control magnet circuits 152 and 153 for manual control of the motions of the horizontal slide.

The switch S6 is also a single-arm double-throw switch adapted to connect the positive side of the main line circuit L+ through lead 120 with lead 133 for automatic control by the relay RS, or through the short inter-connecting lead 187 to carry the current to the switch S5 for manual control of the horizontal slide through the leads 178 and 179.

The switch S7 is the main operating switch and comprises two arms or blades for closing both the high potential and low potential circuits, one blade connecting the positive main line circuit L+ to the lead 120 and the other closing the circuit of lead 132 from the 14 volt generator to the terminal and through lead 131 to the in (113) and out (123) magnets of the relays controlling high potential circuits 116 and 126 to control magnets for the transverse slide.

In order to protect the work from excess motion of the transverse slide, a depth limit switch is considered necessary and, therefore, such a switch is indicated as located in circuit with lead 112, the connecting terminals 188 being bridged by a contact piece 189, which is preferably mounted on a rod or arm 190 adapted to be operated by the slide when the predetermined limit of the in motion of the transverse slide is reached, for breaking the circuit to the in relay magnet 113 and stopping the in motion.

Likewise, it is desirable to provide an out limit switch and accordingly the lead 122—109 to the out relay magnet 123 is provided with terminal contacts 191 bridged by a contact piece 192 carried on a rod or arm 193, adapted to be operated to break the circuit to the out relay magnet when the previously set limit of out motion for the transverse slide is reached. Similar limiting switches are shown and described in Shaw Patent No. 1,683,581, above referred to.

From the above, it will be seen that for operating the machine under automatic control of the tracer, the main switch S7 should be closed and the switch S6 or S4, to connect the lead 120 of the positive side of the main line circuit with lead 133 and switch S2 and S1 closed connect the low potential circuits of the in and out relay magnets 113 and 123 with the respective tracer contacts for tracer control of the toward and from motions of the transverse slide (9) through the respective relay armatures and the leads 116 and 126.

For manual control, as previously pointed out, the switch S1 is operated for the low potential circuit to the relays for in and out movement of the transverse slide and the switch S3 or S5 closed for manual control of the vertical or horizontal slide for direct and reverse motions of the respective slides.

It will be understood that while the preferred form and arrangement of the improvement for hydraulic operation and control of machine tools has been shown and described, the invention is not limited to the specific construction shown, for various modifications in the details and arrangement of the hydraulic means and tracer control may be made without departing from the spirit and scope of the invention.

I claim:—

1. The hydraulic operation and control of machine tools, comprising horizontal, vertical and transverse slides, means for supplying fluid under pressure to hydraulically operated means for effecting direct and reverse motions of the respective slides, valves controlling the fluid to said hydraulically operated means for controlling motions of the respective slides, means including pipe connections for interlocking the valves controlling motion of the transverse slide with the valves controlling motions of the horizontal and vertical slides so that motions of the latter cannot be effected in either direction during in or out motion of the transverse slide.

2. The hydraulic operation and control of machine tools as in claim 1, wherein electro-magnets are provided for operating the valves controlling the hydraulically operated means for motion of the transverse slide in and out, and wherein an electric tracer mounted on said transverse slide for cooperation with the pattern is provided with front and back contacts to open and close circuits controlling respectively the valve magnets for the in and out motions of said transverse slide.

3. The hydraulic operation and control of machine tools as in claim 1, wherein electro-magnets are provided for operating the valves controlling hydraulically the motions of the horizontal and vertical slides, and means controlled by the motions of the respective horizontal and vertical slides are provided for closing circuits of the respective magnets for controlling the direction of motion of the respective slides.

4. The hydraulic operation and control of machine tools as in claim 1, wherein manually operated valves are provided controlling hydraulic operation of the horizontal and vertical slides for direct and reverse motions of the horizontal and vertical slides, the hydraulic interlock being adapted to prevent such motions if the transverse slide is in motion.

5. The hydraulic operation and control of machine tools, comprising horizontal, vertical and transverse slides, pistons and cylinders adapted to be hydraulically operated for effecting direct and reverse motions of the respective slides, pipe connections for conducting fluid under pressure to the respective cylinders, electro-magnetically operated valves in the pipe connections to the respective cylinders for controlling the motions, two of which are for controlling the in and out motions of the transverse slide, auxiliary valves interlocked with the respective valves controlling the in and out motions of the transverse slide, for controlling the flow of fluid under pressure to the cylinders of the horizontal and vertical slides, the arrangement being such that when one of the valves for either in or out motion of the transverse slide is operated by its electromagnet, the associated auxiliary valve will cut off the supply of fluid to the cylinders of the horizontal and vertical slides.

6. The hydraulic operation and control of machine tools as in claim 5, wherein mechanical interlocking means are provided between the valves controlling the flow of fluid to the cylinder of the transverse slide and the associated auxiliary valves, and resilient means are provided to restore both valves to normal after operation electro-magnetically.

7. The hydraulic operation and control of machine tools as in claim 5, wherein electro-magnetically operated valves in the pipe connections are provided to control the flow of fluid under pressure to the horizontal and vertical cylinders for operating the respective valves, and a double pole two-way switch is provided for placing in operation the circuit for either the horizontal or vertical valve magnets.

8. The hydraulic operation and control of machine tools as in claim 5, wherein circuits to the respective electro-magnets of the valves are provided with manually operated switches for controlling energization of the magnets for direct and reverse motions of the respective slides.

9. The hydraulic operation and control of machine tools as in claim 5, wherein said auxiliary valves control the flow of fluid under pressure to the cylinders of the horizontal and vertical slides and switches in the electric circuits to the respective electro-magnets of the slides for controlling the operation of the valves for direct and reverse motions of the respective slides.

10. The hydraulic operation and control of machine tools as in claim 5, wherein said auxiliary valves act as the table stop for controlling horizontal and vertical motions, and reversing contactors operable by the respective slides are provided in the circuits to the respective valve magnets operable by the respective slides for reversing the direction of motion at the end of the run in either direction, said motions in either direction being controlled by said table stop auxiliary valves.

11. In a machine tool, the combination of a work and pattern support, a tool and tracer, a support therefor mounted on a slide for motion relative to the work and pattern, hydraulic transmission mechanism comprising means supplying fluid under pressure, an hydraulic motor for effecting direct and reverse motion of said slide, pipe connections for delivering said fluid to and discharging it from the motor, valves in said pipe connection for controlling the flow of fluid into and from the motor for effecting motion of said slide in both directions, said valves when closed being adapted to prevent motion of said slide in either direction, electro-magnets for operating said valves and electrical contacts operable by said tracer for closing circuits to the respective electro-magnets for said direct and reverse motions as the tracer follows the pattern.

12. The machine tool as in claim 11, wherein tracer eliminating switches are provided in the electrical wiring connections for the valve magnets, and switches are provided for operating the valves directly by closing the circuits of the respective electro-magnets.

13. In a machine tool, the combination of a work and pattern support, a tool and tracer, a support therefor mounted on a transverse slide for toward and from motion relative to the work and pattern, a second slide mounted for motion at right angles to the motion of the transverse slide upon which the transverse slide is slidably mounted, hydraulic transmission mechanism comprising means for supplying fluid under pressure, hydraulic motors for effecting direct and reverse motion of the respective slides, pipe connections for delivering said fluid under pressure to and discharging it from the respective motors, valves in said pipe connections for controlling the flow of fluid into and from the respective motors for controlling direct and reverse motions of the respective slides, electro-magnets for operating said valves and pipe connections and valves interlocking said motors so that the motor of said second slide cannot be operated when valves for direct or reverse motion of the transverse slide are operated.

14. The machine tool as in claim 13, wherein the pipe connections for delivering the fluid under pressure to the respective motors are provided with valves which control the flow of fluid both into and from the motors, said valves being so arranged that when closed the flow of fluid into or from the motors is prevented, thereby locking the respective slides against motion.

15. The machine tool as in claim 13, wherein the pattern following tracer energizes circuits through the electro-magnets to control said valves for the toward and from motions of the transverse slide and to control said valves for the transverse slide control motion of said second slide.

16. In a machine tool, the combination of a slide mounted for direct and reverse motion, hydraulic transmission means comprising means for supplying fluid under pressure, a motor utilizing said fluid for effecting direct and reverse motion of said slide, valves for controlling the flow of said fluid to the motor, for the direct and reverse motions of the slide, electro-magnets for operating said valves, one magnet for operating the valve for direct motion and another magnet for operating the valve for reverse motion, electric circuits to the respective valve magnets, reversing relays in said electric circuits, one for each valve magnet, each relay being adapted to break the circuit of one magnet and close the circuit of the other, and a reversing contactor adapted to be operated by said slide in its direct and reverse motions for closing circuits actuating said relays for making and breaking the respective magnet circuits for changing the direction of motion of said slide.

17. The machine tool as claimed in claim 16, wherein said reversing contactor is provided with means for closing a circuit for operating one relay at the end of the run of the slide in one direction and of the other relay at the end of the run in the other direction, the reversing relays breaking the circuit of the energized valve magnet and closing the circuit of the deenergized valve magnet for operating the corresponding valve and reversing the direction of motion.

18. The machine tool as in claim 16, wherein said reversing contactor is provided with a safety switch for opening the circuit of the energized valve magnet to permit the valve to close and stop the motion after a predetermined run of the slide and means independent of said magnet for closing the valve when the magnet is deenergized.

19. The machine tool as in claim 16, wherein manual switches are provided in the electrical circuits for arranging said circuits for operation of said valves by the reversing contactors and relays.

20. The machine tool as in claim 16, wherein manual switches in the electrical circuits and auxiliary electric circuit connections are provided for effecting energization of the respective valve magnets independently of the reversing contactors and relays for manual control of the direct and reverse motions of the slide.

21. The hydraulic operation and control of machine tools, comprising a transverse slide mounted for in and out motion, a tracer and cutter mounted on said slide for motion therewith toward and from the pattern and work respectively, a cylinder having a piston therein operated hydraulically for effecting in and out motion of the transverse slide and valves controlled by the tracer by cooperation with the pattern for controlling the in and out motions of said transverse slide, said transverse slide being supported on a vertical slide, provided with an hydraulically operated cylinder having a piston therein for effecting up and down motion of said slide and valves controlling motion of said vertical slide are interlocked with the valves controlling motion of said transverse slide in such positions that when the valves are operated for motion of the transverse slide either in or out, the vertical slide is held against motion in either direction.

22. The hydraulic operation and control of machine tools, comprising horizontal, vertical and transverse slides, cylinders having hydraulically operated pistons therein for effecting direct and reverse motions of the respective slides, pipe connections for conducting fluid under pressure to the respective cylinders for operation of the pistons thereof for the direct and reverse motions of the slides, and valves in said pipe connections for controlling the direction of flow of said fluid for the direct and reverse motions of the respective slides, electro-magnets for positioning said valves and an electric tracer mounted on said transverse slide for cooperation with the pattern to energize circuits to said electro-magnets for controlling in and out motions of the transverse slide, and manually operated switches to control the respective valves for direct and reverse motions of the horizontal and vertical slides.

23. The hydraulic operation and control of machine tools, comprising horizontal, vertical and transverse slides, cylinders having hydraulically operated pistons therein for effecting direct and reverse motions of the respective slides, pipe connections for conducting fluid under pressure to the respective cylinders for operation of the pistons thereof for the direct and reverse motions of the slides and valves in said pipe connections for controlling the direction of flow of said fluid for the direct and reverse motions of the respective slides, electro-magnets for positioning said valves for the respective hydraulic cylinders, electric circuits having a switch therein for placing in operation either the horizontal or vertical electro-magnetic valves, and reversing contactors actuated by the respective slides to control the respective circuits for the valve magnets for changing the direction of motion of the slides.

24. In a milling machine, a slidable carriage, a rotatable cutter carried by said carriage, a work support provided with a master, hydraulically operated mechanism for producing relative motion between the carriage and work support, auxiliary valves controlling said hydraulically operated mechanism, a tracer mechanism, the tracer whereof follows the contour of said master, and electrical circuits opened and closed by said tracer for controlling the positions of the valves for said hydraulically operated mechanism so that the work on said support will be cut in conformity with the outline of said master.

25. In a milling machine, a slidable carriage, a rotatable cutter carried by said carriage, a work support provided with a master, hydraulic means for relatively moving said carriage and work support, auxiliary valves controlling said hydraulic mechanism, a tracer mechanism carried by said carriage having the tracer thereof in contact with said master, and electrical circuits opened and closed by said tracer, magnetic clutches energized thereby for controlling the positions of the auxiliary valves for said hydraulic means so that the work on said support will be outlined by said cutter in conformity with the outline of said master.

26. In a machine tool, the combination of two slides movable in directions at right angles to each other, hydraulic transmission means comprising a pump for supplying fluid under pressure, pistons and cylinders adapted to be operated by said fluid for effecting the respective motions of said slides, a third slide supported for motion at right angles to the directions of movements of said first mentioned slides, hydraulic transmission means comprising a piston and cylinder and operable by the pressure fluid within the cylinder for effecting direct and reverse motions of said last mentioned slide, pipe connections for flowing the pressure fluid into and from the ends of the respective cylinders, valves in the pipe connections for controlling the flow of fluid both into and from the cylinders for at least two of the slides, said valves being adapted in normal closed position to cut off flow of fluid both into and from their respective cylinders, whereby said slides are positively held against motion when the valves are closed in any positions of the pistons in the cylinders.

27. The machine tool as in claim 26, wherein the valves for controlling the motions of the last mentioned slide are associated with valves connected for operation in unison therewith for cutting off flow of the pressure fluid in the pipe connections to the cylinders for operating the first mentioned slides, whereby motions of said first mentioned slides cannot take place when the valves for motion of the last mentioned slide are open.

28. In a machine tool, the combination of three slides movable at right angles to each other, hydraulic transmission mechanism comprising means for supplying fluid under pressure, cylinders and pistons adapted to be operated by said fluid for effecting direct and reverse motions of the respective slides, pipe connections for conducting the fluid under pressure into and from both ends of the respective cylinders for operation of the pistons thereof for the direct and reverse motions of the slide, duplicate valves in said pipe connections for each end of the cylinder for controlling the flow of said fluid into and from the cylinders for said direct and reverse motions of the respective slides and means in manually controlled circuits for operating said valves.

29. The hydraulic operation and control of machine tools, comprising a first slide, a tracer and cutter mounted on said slide for motion therewith toward and from the pattern and work respectively, a cylinder having a piston therein operated hydraulically for effecting motion of the slide, and valves controlled by the tracer by cooperation with the pattern for controlling the motions of said slide, a second slide provided with a cylinder having a piston therein for effecting motion of said second slide horizontally transversely of said master and work, valves for controlling the transverse motion of the second slide and means interlocking said valves with the valves controlling motion of said first slide in such positions that motion of the second slide is prevented when either in or out motion of said first slide is effective.

ROBERT D. SHAW.